United States Patent [19]

Bechtner

[11] Patent Number: 4,473,820

[45] Date of Patent: Sep. 25, 1984

[54] SIGNAL DECODER FOR CONVERTING A CO-DIRECTIONAL 64 KBIT/S INTERFACE SIGNAL INTO A BINARY INFORMATION SIGNAL, A 64 KHZ CLOCK AND AN 8 KHZ CLOCK

[75] Inventor: Ruediger Bechtner, Munich, Fed. Rep. of Germany

[73] Assignee: Siemens Aktiengesellschaft, Berlin & Munich, Fed. Rep. of Germany

[21] Appl. No.: 368,450

[22] Filed: Apr. 14, 1982

[30] Foreign Application Priority Data

May 21, 1981 [DE] Fed. Rep. of Germany ....... 3120282

[51] Int. Cl.³ .......................................... H03K 13/24
[52] U.S. Cl. ................................ 340/347 DD; 375/17
[58] Field of Search ................... 340/347 DD; 375/17; 235/310, 311; 360/40-44

[56] References Cited

U.S. PATENT DOCUMENTS 4,380,080  4/1983  Rattlingourd ......................... 375/17

OTHER PUBLICATIONS

CCITT Orange Book, vol. III-2, Line Transmisssion, pp. 432-433 (Rec. G.732), 458-459 (Rec. G.744).

*Primary Examiner*—T. J. Sloyan
*Attorney, Agent, or Firm*—Hill, Van Santen, Steadman & Simpson

[57] ABSTRACT

A signal decoder converts a co-directional 64 kbit/s interface signal which is divided into half waves into a binary information signal, a 64 kHz clock and an 8 kHz clock. A circuit arrangement is provided for each half wave in which criteria of the signal to be decoded are input into three memories at points in time specified by a counter. The conditions at the outputs of the corresponding memories of each arrangement are combined with OR gates. The decoded signals can be tapped at the outputs of the OR gates. The signal decoder may be employed in the data signal inputs of a system PCM 30F, a PCM exchanger or a 64 kbit/s terminal.

7 Claims, 4 Drawing Figures

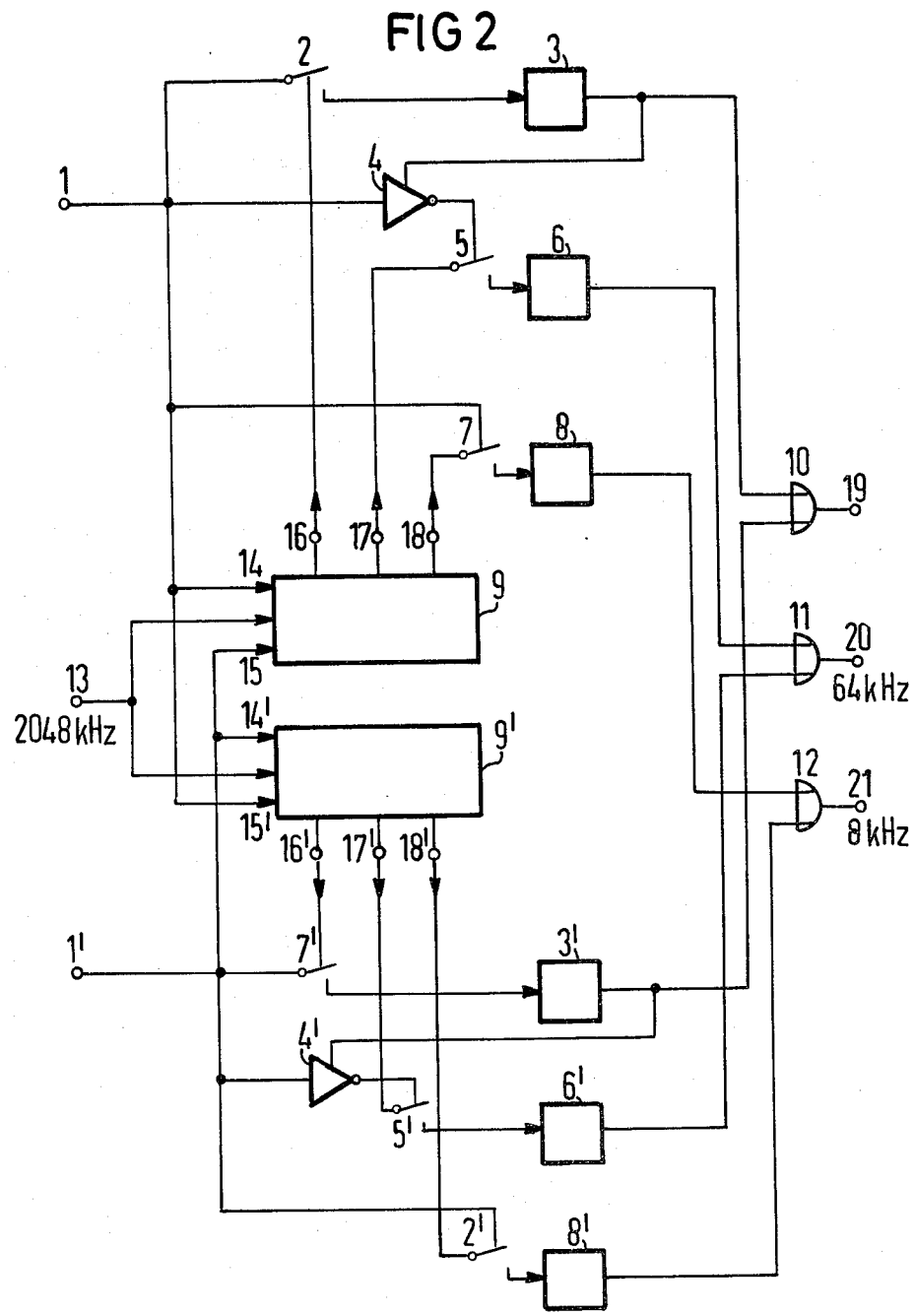

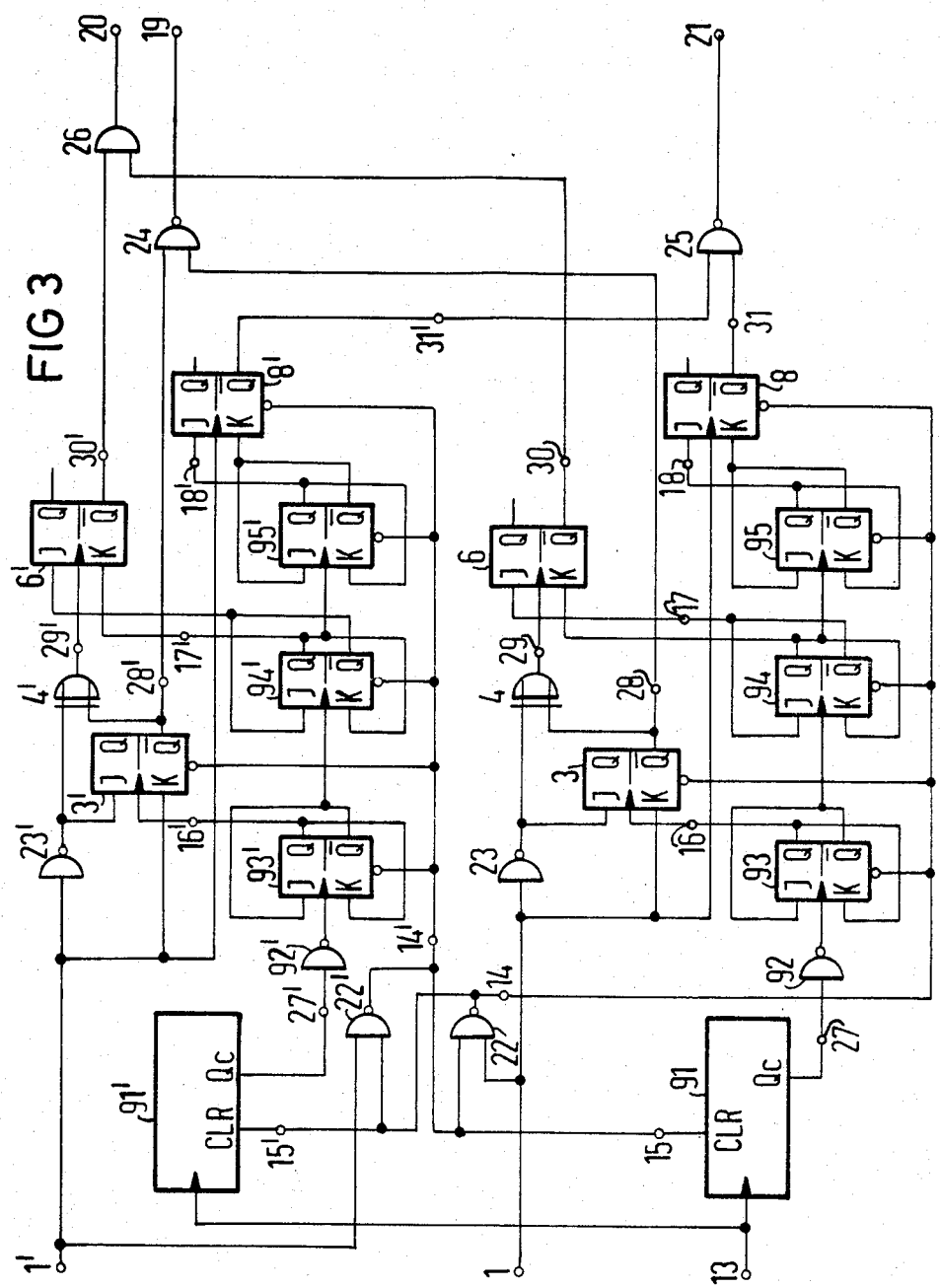

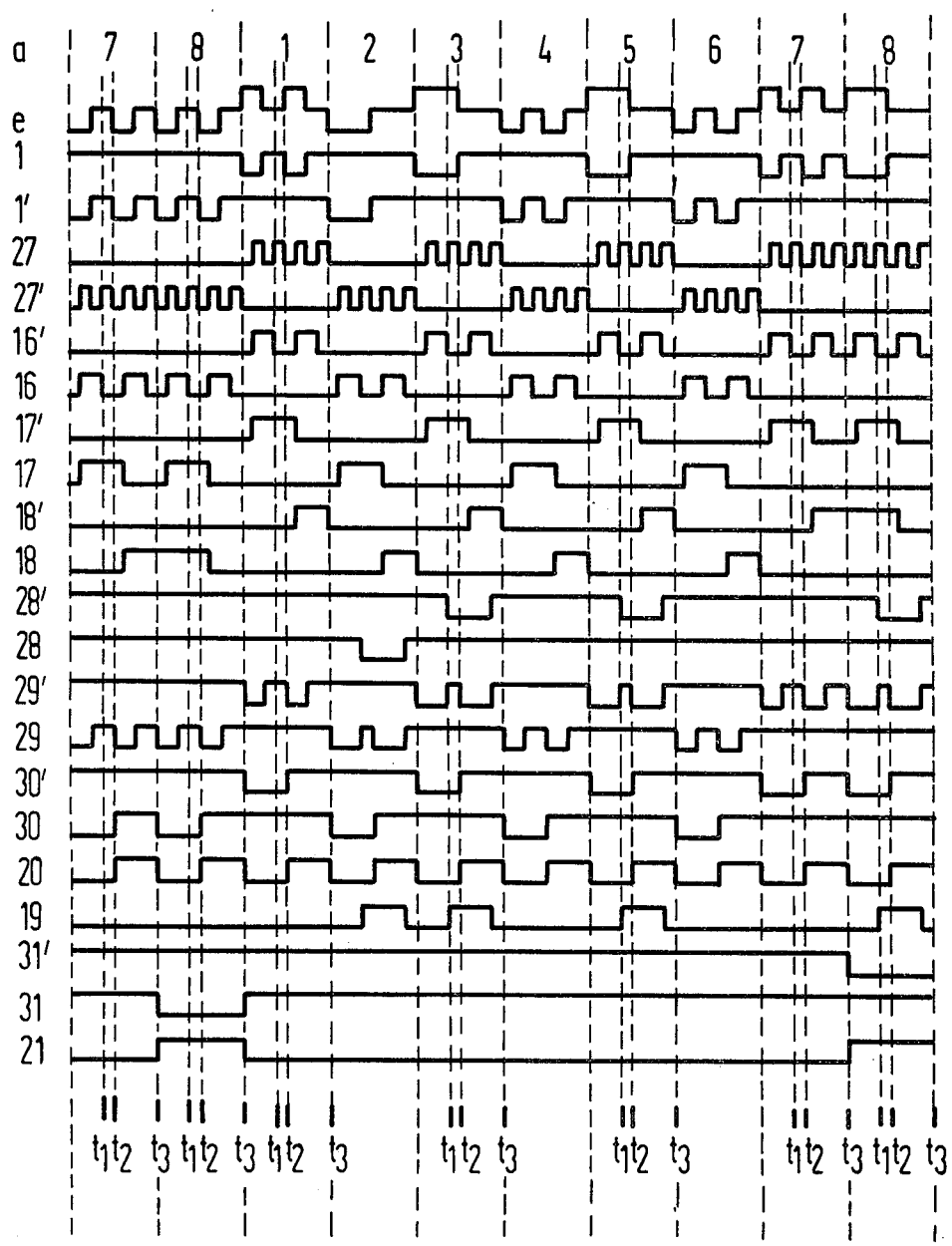

SIGNAL DECODER FOR CONVERTING A CO-DIRECTIONAL 64 KBIT/S INTERFACE SIGNAL INTO A BINARY INFORMATION SIGNAL, A 64 KHZ CLOCK AND AN 8 KHZ CLOCK

BACKGROUND OF THE INVENTION

1. Field of the Invention

The present invention relates to a signal decoder for the conversion of a co-directional 64 kbit/s interface signal which is divided into a positive half wave and into a negative half wave and is amplified, being converted into a binary information signal, into a 64 kHz clock and into an 8 kHz clock.

2. Description of the Prior Art

Interface signals of the type set forth above are defined in the CCITT Orange Book, Vol. III-2, Line Transmission, 1977, pp. 432–433, G. 732 or pp. 458–459, G. 744.

SUMMARY OF THE INVENTION

The object of the present invention is to realize a signal decoder which operates in accordance with the above requirements.

Beginning with a signal decoder of the type generally set forth above, the above object is achieved, according to the present invention, in that a first memory is provided for each half wave, the input of the memory being connected by way of a first switch to the input for receiving the half wave. A second memory is provided for each half wave, the input of the second memory being connected to the output of a second switch whose control input is, in turn, connected to the output of a controllable inverter. The controllable inverter has an input which is connected to the input for receiving the half wave and a control input connected to the output of the first memory. A third memory is provided for each half wave, the input of the third memory being connected to the output of a third switch whose control input is, in turn, connected to the input for receiving the half wave. A counter is provided for each half wave, the start input of the counter being connected to the input for receiving the first half wave, its stop input being connected to the input for receiving the second half wave, its first command output being connected to the control input of the first switch, its second command output being connected to the input of the second switch and its third command output being connected to the input of the third switch. A first OR gate is provided whose inputs are respectively connected to an output of the first memory and whose output emits the information signal. A second OR gate is provided whose inputs are connected to a respective output of the second memory and whose output emits the 64 kHz clock. A third OR gate is provided whose inputs are connected to a respective output of the third memory and whose output emits the 8 kHz clock.

This solution for decoding provides that the decoded signal is exclusively derived from the edges of the input signal.

It is advantageous for a decoding of an interface signal according to the CCITT recommendation G.732 when threestage binary, internal counters are provided whose stage outputs are connected to the command outputs of the counters, and when 8:1 dividers are provided and have inputs which receive the system clock at 2048 kHz the inverted outputs thereof are connected to the clock inputs of the internal counters.

It is thereby advantageous when the closing phase of the first switch lies at $\frac{3}{8}$, the closing phase of the second switch lies at $\frac{1}{2}$ and the closing phase of the third switch lies at $\geq 1$ of the duration of the code words for the conditions "0" and "1".

It is advantageous for the decoding of an interface signal according to CCITT recommendation G.744 when the threestage binary counters are provided whose stage outputs are connected to the command outputs of the counters and when 32:1 dividers are provided at whose inputs the system clock 8448 kHz is connected and whose inverted outputs are connected to the clock inputs of the internal counters.

A signal decoder constructed in accordance with the present invention is advantageously suitable for use in the data inputs of a system known as the PCM 30 F, of a PCM exchange or of a 64 kbit/s terminal.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 illustrates a signal decoder constructed in accordance with the present invention;

FIG. 3 illustrates a more detailed and practical execution of a signal decoder constructed in accordance with the present invention; and FIG. 4 is a pulse diagram relating to the signal decoder constructed according to FIG. 3.

DESCRIPTION OF THE PREFERRED EMBODIMENTS

Figure 1:
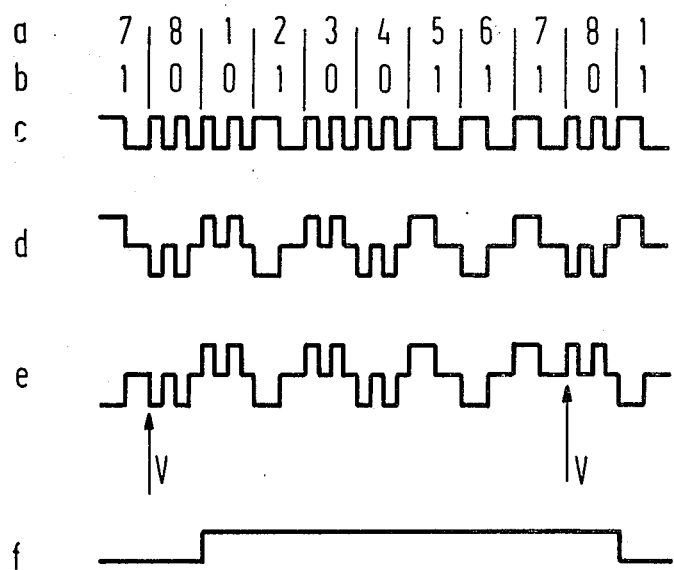
FIG. 1 illustrates an interface signal according to the CCITT recommendation G.732.

FIG. 1 illustrates the stages for the formation of the co-directional interface signal. The line a illustrates the bit number, the line b illustrates the conditions of the 64 kbit/s signal, and the line c illustrates a signal in which the condition "0" is formed by a code word "1010" and the condition "1" is formed by a code word "1100". Further, the line d illustrates a signal in which these code words are alternately inverted. The line e illustrates this signal in which each eighth code word violates the inversion rule. These locations are identified at V. Finally, the line f illustrates an octet timing.

FIG. 2 illustrates a signal decoder constructed in accordance with the invention. For one half wave, the arrangement comprises an input 1, a plurality of switches 2, 5 and 7, a controllable inverter 4, a plurality of memories 3, 6 and 8, and a counter 9. A corresponding arrangement for the other half wave is referenced with the same reference characters primed. The outputs of the memories are combined by a plurality of OR gates 10, 11 and 12.

The counter 9 and 9' comprise a respective start input 14, 14', a respective stop input 15, 15', a respective first command output 16, 16', a respective second command output 17, 17', a respective third command output 18, 18' and commonly connected clock inputs 13.

The manner of operation of the signal decoder according to FIG. 2 will be explained in greater detail with the assistance of the pulse diagram of FIG. 4. A half wave is applied to the input 1. Controlled by the signal at the command output 16, the switch 2 closes at times $t_1$. The condition existing at this moment in the half wave is retained in the memory 3. The condition from the output of a second stage of the counter 9 is available at the command output 17. This condition is forwarded at a time $t_2$ to the memory 6 via the switch 5, the switch 5 being closed with the signal at the input 1, whereby the condition at the output of the memory 3 guarantees that it is only signal edges of one type which will become effective at the output of the controlled inverter 4. The condition at the command output 18, which can be seen from FIG. 4, is always forwarded via the switch 7 to the memory 8 at the time $t_3$ when signal edges of one type occur at the input 1. The described process sequences in the same manner in the second half of the circuit when the other half wave is applied to the input 1'.

An alternating function of both half waves of the arrangement is effected by the start/stop signals at the inputs 14 and 15 or, respectively, 14' and 15'. The signals of the corresponding memories 3 and 3', 6 and 6', 8 and 8' are combined at the OR gates 10, 11 and 12. The decoded information signal appears at the output 19, a 64 kHz clock appears at the output 20, and an 8 kHz clock appears at the output 21.

FIG. 3 illustrates a practical construction of the signal decoder according to FIG. 2. The counter 9 comprises an 8:1 divider 91, an inverter 92 and three stages 93, 94 and 95 of an internal counter. Likewise, the counter 9' comprises an 8:1 divider 91', an inverter 92' and three stages 93', 94' and 95' of an internal counter. An RS memory 22, 22' forms the start/stop commands for both of the counters 9 and 9'. The logical linkage of the memory outputs occurs by means of the gates 24, 26 and 25.

The manner of operation of the signal decoder according to FIG. 3 can also be taken from the pulse diagram of FIG. 4 on the basis of the cited circuit points.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A signal decoder for converting a co-directional 64 kbit/s interface signal, which is divided into positive and negative half waves, into a binary information signal, a 64 kHz clock and an 8 kHz clock, comprising:

a first input for receiving a first of the half waves, a second input for receiving a second of the half waves and a system clock input;

a first memory and a first switch connecting said first memory to said first input, a first controllable inverter including a control input connected to said first memory, an input connected to said first input, and an output;

a first multi-stage counter including a start input connected to said first input, a stop input connected to said second input, a third input connected to said system clock input an first, second and third outputs, said first output of said first multi-stage counter connected to operate said first switch;

a second memory and a second switch for connecting said second memory to said second output of said first multi-stage counter, said second switch connected to and operated by said output of said first controllable inverter;

a third memory and a third switch for connecting said third memory to said third output of said first multistage counter, said third switch connected to and operated by said first input;

a fourth memory and a fourth switch connecting said fourth memory to said second input;

a second controllable inverter including a control input connected to said fourth memory, an input connected to said second input, and an output;

a second multi-stage counter including a start input connected to said second input, a stop input connected to said first input, a third input connected to said system clock input, and first, second and third outputs, said first output of said second multi-stage counter connected to operate said fourth switch;

a fifth memory and a fifth switch for connecting said fifth memory to said second output of said second multistage counter, said fifth switch connected to and operated by said output of said second controllable inverter;

a sixth memory and a sixth switch for connecting said sixth memory to said third output of said second multistage counter, said sixth switch connected to and operated by said second input; and first, second and third OR gates, said first OR gate including a first input connected to said first memory, a second input connected to said fourth memory and an output for providing the binary information signal, said second OR gate including a first input connected to said second memory, a second input connected to said fifth memory and an output for providing said 64 kHz clock, and said third OR gate including a first input connected to said third memory, a second input connected to said sixth memory and an output for providing the 8 kHz clock.

2. The signal decoder of claim 1, for use in accordance with CCITT G.732, wherein each of said multistage counters comprises:

an internal counter including a clock input and said first, second and third outputs; and an 8:1 divider including a clock input connected to said system clock input, said system clock being a 2048 kHz clock, and an inverted output connected to said clock input of said internal counter.

3. The signal decoder of claim 1, wherein:

each of said internal counters is constructed to provide a closing time $t_1$ for said first and fourth switches, a closing time $t_2$ for said second and fifth switches and a closing time $t_3$ for said third and sixth switches, where $t_1 = \frac{3}{8}$ $t_2 = \frac{1}{2}$; and $t_3 \geq 1$ of the duration of the code words for the conditions "0" and "1".

4. The signal decoder of claim 1, for use in accordance with CCITT G.744, wherein each of said multistage counters comprises:

an internal counter including a clock input and said first, second and third outputs; and a 32:1 divider including a clock input connected to said system clock input, said system clock being an 8448 kHz clock, and an inverted output connected to said clock input of said internal counter.

5. The signal decoder of claim 1, in combination with a pulse code modulation system which includes a data signal input circuit and wherein said signal decoder is in said data signal input circuit.

6. The signal decoder of claim 1, in combination with a pulse code modulation exchange which includes a data signal input circuit and wherein said signal decoder is in said data signal input circuit.

7. The signal decoder of claim 1, in combination with a 64 kbit/s terminal which includes a data signal input circuit and wherein said signal decoder is in said data signal input circuit.

* * * * *